United States Patent
Berlin

(10) Patent No.: US 9,336,395 B2
(45) Date of Patent: May 10, 2016

(54) BOOT DRIVER VERIFICATION

(71) Applicant: HEWLETT-PACKARD DEVELOPMENT COMPANY, L.P., Houston, TX (US)

(72) Inventor: Kimon Berlin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 13/750,359

(22) Filed: Jan. 25, 2013

(65) Prior Publication Data

US 2014/0215196 A1 Jul. 31, 2014

(51) Int. Cl.
G06F 21/57 (2013.01)

(52) U.S. Cl.
CPC ............ *G06F 21/575* (2013.01); *G06F 21/572* (2013.01)

(58) Field of Classification Search
CPC ..... G06F 21/57; G06F 21/572; G06F 21/575; G06F 21/577
USPC ...................................................... 713/2, 187
See application file for complete search history.

(56) References Cited

U.S. PATENT DOCUMENTS

| | | | | |
|---|---|---|---|---|
| 7,574,481 B2* | 8/2009 | Moore et al. | | 709/217 |
| 7,676,640 B2* | 3/2010 | Chow | | G06F 8/665 |
| | | | | 711/157 |
| 8,069,487 B2* | 11/2011 | Fanton et al. | | 726/27 |
| 8,527,978 B1* | 9/2013 | Sallam | | 717/168 |
| 2005/0138370 A1* | 6/2005 | Goud et al. | | 713/164 |
| 2007/0079373 A1* | 4/2007 | Gassoway | | 726/22 |
| 2008/0126779 A1 | 5/2008 | Smith | | |
| 2008/0165952 A1* | 7/2008 | Smith et al. | | 380/28 |
| 2008/0244257 A1 | 10/2008 | Vaid et al. | | |
| 2009/0249053 A1 | 10/2009 | Zimmer et al. | | |
| 2009/0327741 A1 | 12/2009 | Zimmer et al. | | |
| 2010/0082963 A1* | 4/2010 | Li | | G06F 11/1417 |
| | | | | 713/2 |
| 2012/0179904 A1 | 7/2012 | Dunn et al. | | |
| 2012/0255018 A1* | 10/2012 | Sallam | | 726/24 |
| 2013/0124843 A1* | 5/2013 | Bobzin | | 713/2 |
| 2013/0247024 A1* | 9/2013 | Sallam | | 717/173 |
| 2014/0025939 A1* | 1/2014 | Smith et al. | | 713/2 |

OTHER PUBLICATIONS

Christodorescu et al., "Cloud Security is Not (Just) Virtualization Security," CCSW '09, Nov. 13, 2009, pp. 97-102.
Selhorst et al., "TSS Study," Study on behalf of the German Federal Office for Information Security (BSI), Sirrix AG Security Technologies, Version 1.0, Oct. 2008.

* cited by examiner

Primary Examiner — Saleh Najjar
Assistant Examiner — Louis Teng
(74) Attorney, Agent, or Firm — HP Inc. Patent Department

(57) ABSTRACT

An example system in accordance with the present disclosure includes a secure hash calculation engine to intercept and calculate a secure hash for a pre-boot driver before the pre-boot driver is executed, wherein the pre-boot driver is executed based on the computed secure hash being successfully verified, and wherein the pre-boot driver is not executed based on the computed secure hash not being successfully verified.

17 Claims, 5 Drawing Sheets

BOOT DRIVER VERIFICATION

BACKGROUND

Recent versions of the Unified Extensible Firmware Interface (UEFI) specification include support for a new boot mechanism, called Secure Boot. Secure Boot prevents running malware before the operating system (OS) loads by relying on a system of digital signatures embedded in executable images, and blocking execution of unsigned (or incorrectly signed) images. After the OS handoff, OS-based software is used to defend against malware. The Secure Boot mechanism is expected to proliferate in the personal computer sector as operating system vendors add these signatures to their loaders and pre-handoff code, and as hardware vendors add them to their pre-OS device drivers.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The present disclosure is generally directed at a pre-boot driver verification process. The Secure Boot discussed above may require modifications in each of the firmware, the pre-OS drivers, and the OS loader code, and thus cannot be used with older operating systems and devices that have already been released. This leaves personal computers (PCs) running widespread operating systems and devices that may be vulnerable to boot-driver-centric malware. A disclosed method is provided to rectify the lack of the additional security for systems that do not verify the integrity of pre-boot drivers and early OS code, such as OS loaders and OS kernels, before executing the same.

The disclosed method may add a new security feature, a boot driver verification process, to a computer system that may not require a new pre-OS device driver or pre-handoff OS upgrades. This method may involve code in a computer system's Basic Input/Output System (BIOS) to cause the processor to perform a security check on each pre-boot driver after it loaded but before it is executed by the processor. The security check may involve a secure hash to be calculated for the pre-boot driver, and then the secure hash may be compared to a list of known good secure hashes for that pre-boot driver and others.

The list of known good hashes, or a "whitelist," may contain the proper secure hash results for a majority of pre-boot drivers associated with peripheral cards used by PCs. The whitelist may be maintained and digitally signed by a trusted third party (e.g., a BIOS or computer manufacturer). Secure hash computations may also be performed on files need to start the OS, such as OS kernels, and on sectors of a mass-storage device containing the OS, if the mass-storage device is encrypted for verification purposes. By using whitelists and secure hashes to perform security verifications instead of including secure hash tables in the system BIOS, constant BIOS updates are avoided to keep up with the ever changing drivers and early OS code updates and additions. Lastly, PCs utilizing older BIOS systems are able to have the same added security as newer systems running UEFI boot systems.

Figure 1:
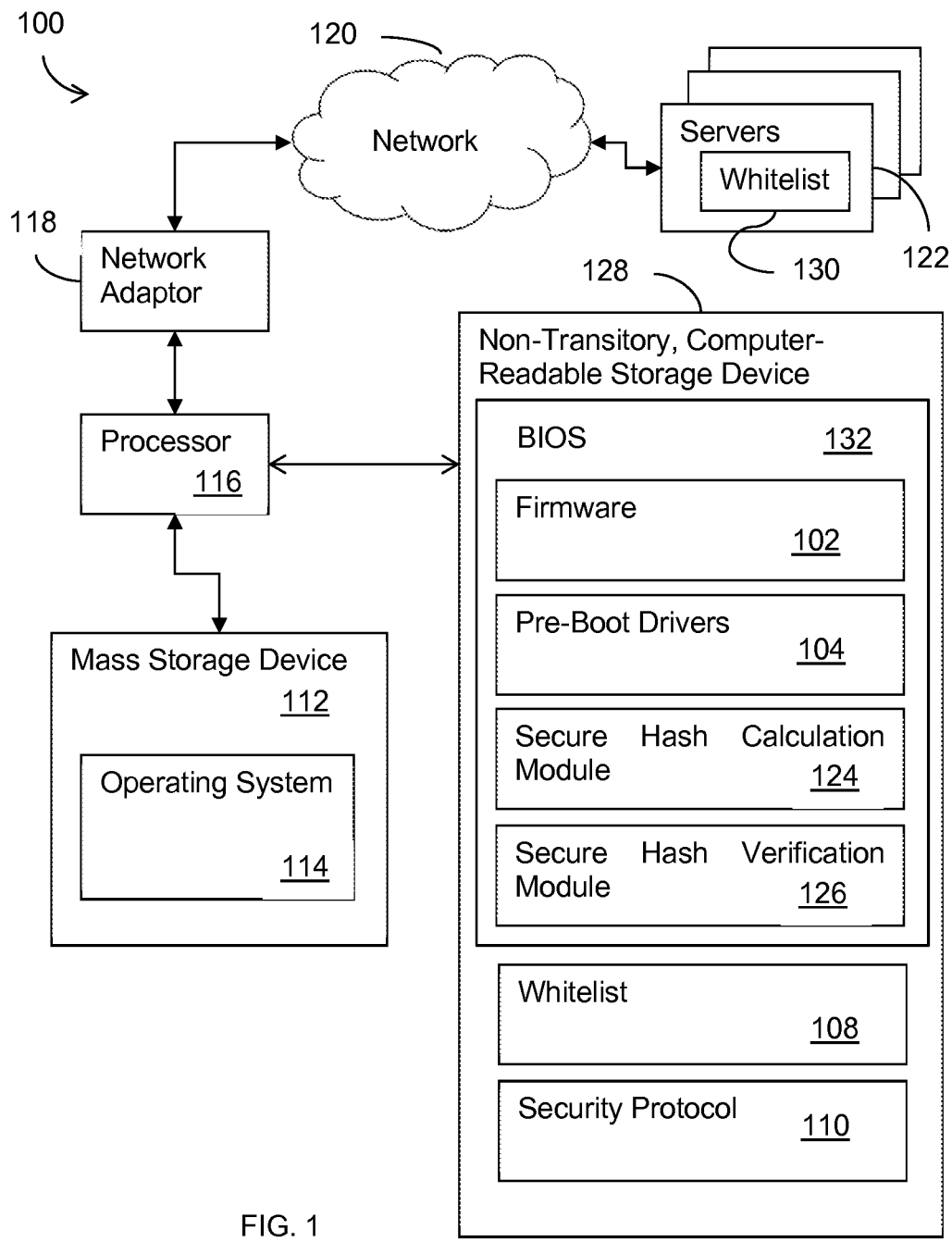
FIG. 1 shows an illustrative implementation of a system in accordance with various examples.

FIG. 1 shows an illustrative implementation of a system 100. The system 100 may comprise a non-transitory, computer-readable storage device 128 coupled to a processor 116, which may be coupled to a mass storage device 112 and a network adaptor 118. The network adaptor 118 may allow for access to a network 120 and one or more servers 122, which may contain a BIOS or computer manufacturer's compiled and digitally signed whitelist 130. The mass storage device 112 may store an OS 114, which may be implemented as various OS kernels.

The non-transitory, computer-readable storage device 128 may store firmware 102, pre-boot drivers 104, a whitelist 108, a security protocol 110, a secure hash calculation module 124, and a secure hash verification module 126. The non-transitory, computer-readable storage device 128 may be implemented as a read only memory (ROM), a flash storage device, or other type of non-transitory storage device, and may be referred to herein as a BIOS storage device 128. Additionally, the firmware 102, pre-boot-drivers 104, the secure hash calculation module 124, and the secure hash verification module 126 may be part of a BIOS 132 implemented by a computer system, for example a PC, a server, a mobile computing device. The BIOS 132 may also contain the whitelist 108 and the security protocol 110, but the whitelist 108 and the security protocol 110 may simply be stored on the non-transitory, computer-readable storage device 128 for security purposes. Alternatively, the security protocol 110 and the whitelist 108 may be stored on another storage device, such as the mass storage device 112.

The pre-boot drivers 104 may be a part of the BIOS stored on the BIOS storage device 128 or they may be a part of a peripheral device that may contain its own BIOS, such as a network card, a video card, a hard drive controller card, to name just a few. The pre-boot drivers 104 may be an extension to the firmware, such as firmware 102, and the pre-boot drivers 104 may operate in conjunction with early OS code up to an OS hand-off operation when the firmware 102 is handing system control over to the OS, such as the OS 114.

The whitelist 108 may be a copy of the whitelist 130 stored on one of the servers 122 and may be stored on the BIOS storage device 128. The whitelist 108 may also be stored on the mass storage device 112, but may be encrypted to prevent tampering in this implementation. The whitelist 108, 130 may be a list of known good secure hashes for the pre-boot drivers 104 and the OS 114 and may be compiled and digitally signed by a trusted third party. The trusted third party may be the BIOS manufacturer that wrote the BIOS 132 and possibly fabricated the BIOS storage device 128. Alternatively, the whitelist 130 may be compiled and digitally signed by the computer manufacturer who built the computer utilizing the BIOS 132 and the BIOS storage device 128.

When the system 100 retains and uses a copy of the whitelist 130, such as the whitelist 108, on their local system, the whitelist 108 may be periodically refreshed. Refreshing the whitelist 108 may be due to the BIOS manufacturer continually updating the whitelist 130 to include new or updated drivers. The whitelist 108 may be updated by the processor 116 sending a request for a copy of the whitelist 130 to the server 122 every time the pre-boot driver verification system 100 is initiated. Alternatively, the whitelist 108 may be periodically updated, once a month for example, by a similar process. Further, the whitelist 108 may be refreshed every time the whitelist 130 is updated by the trusted third party. The trusted third party may send out a notification every time the whitelist 130 is updated and re-digitally signed.

The security protocol 110 may be a client or system 100 configured protocol and the security protocol 110 may respond appropriately when negative verifications are encountered. A negative verification may result when a calculated secure hash for a pre-boot driver does not equal any of the known secure hashes for that pre-boot driver on either the whitelist 108 or 130. A negative verification may mean the pre-boot driver is corrupt. The corruption may be the result of a malware attack or the result a system failure erroneously overwriting the pre-boot driver. The security protocol 110 may be configured to allow pre-boot drivers and early OS code to continue to execute even in the face of a negative verification. Alternatively, the security protocol 110 may be configured to prevent pre-boot drivers and early OS code from executing when a negative verification occurs. Further, the security protocol 110 may be configured to instruct the system 100 to download a new pre-boot driver, or to update the whitelist 108 when the verification process results in a negative outcome.

Figure 2:
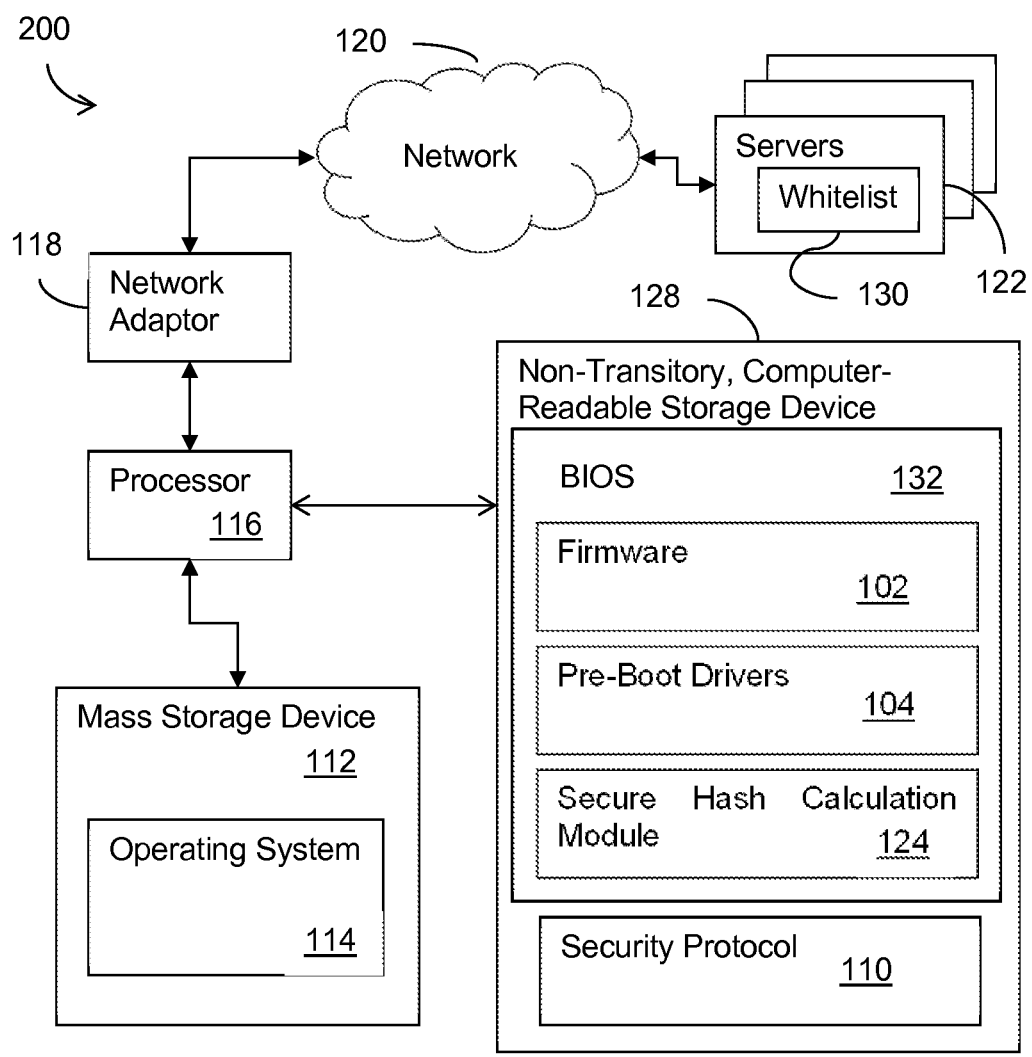
FIG. 2 shows another illustrative implementation of a system in accordance with various examples.

FIG. 2 shows a system 200, which may be another implementation of the system 100 in accordance with various examples. The system 200 may comprise most of the same elements as the system 100 except the whitelist 108 and the secure hash verification module 126 may not be associated with the system 200. Instead, the function implemented by the secure hash verification module 126, may be a part of one of the servers 122. As before, the server 122 may be a server associated and operated by a trusted third party who compiled and digitally signed the whitelist 130. The server 122 may compare the calculated secure hash received from the processor 116 against a known good secure hash for the pre-boot driver located on the whitelist 130. The server 122 may then send the verification result back to the processor 116 so the processor 116 is informed of whether the pre-boot driver should be executed.

Figure 3:
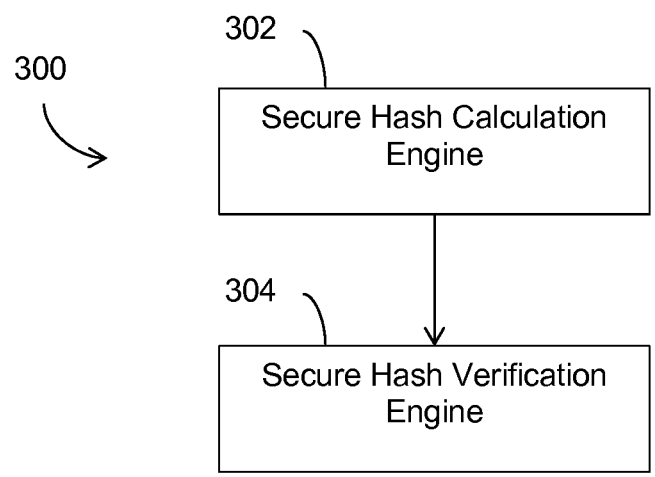
FIG. 3 shows an example of a pre-boot driver verification system in accordance with various examples.

FIG. 3 shows an example of a pre-boot verification system 300 in accordance with various examples and that may be implemented by the illustrative systems 100 and 200. The pre-boot verification system 300 may include a secure hash calculation engine 302 and a secure hash verification engine 304. Although the two engines 302, 304 are shown as separate engines in FIG. 3, in other implementations, the functionality of the two engines may be combined into a single engine or broken up into more than two engines.

In some examples of the illustrative system 100, each engine 302, 304 may be implemented as a processor executing software. FIG. 1, for example, shows one suitable example in which the processor 116 is coupled to the non-transitory, computer-readable storage device 128. Another suitable example is shown in FIG. 2 by the system 200. Each engine 302, 304 may comprise the processor 116 executing the corresponding module 124, 126.

The non-transitory, computer-readable storage device 128 is shown in FIG. 1 and FIG. 2 to include a software module that corresponds functionally to each of the engines of FIG. 3. The software modules may include a secure hash calculation module 124 and a secure hash verification module 126. Additional modules may be included in the non-transitory, computer-readable storage device 128, for example, a pre-boot driver interception module. Each engine of FIG. 3 may be implemented as the processor 116 executing the corresponding software module of FIG. 1. Additionally or alternatively, each engine of FIG. 3 may be implemented as the processor executing the corresponding software module of FIG. 2.

The distinction among the various engines 302, 304 and among the software modules 124, 126 is made herein for ease of explanation. In some implementations, however, the functionality of the two engines/modules may be combined together into a single engine/module. Further, the functionality described herein as being attributed to each engine 302, 304 is applicable to the software module corresponding to each such engine, and the functionality, described herein as being performed by a given module is applicable as well to the corresponding engine.

Figure 4:
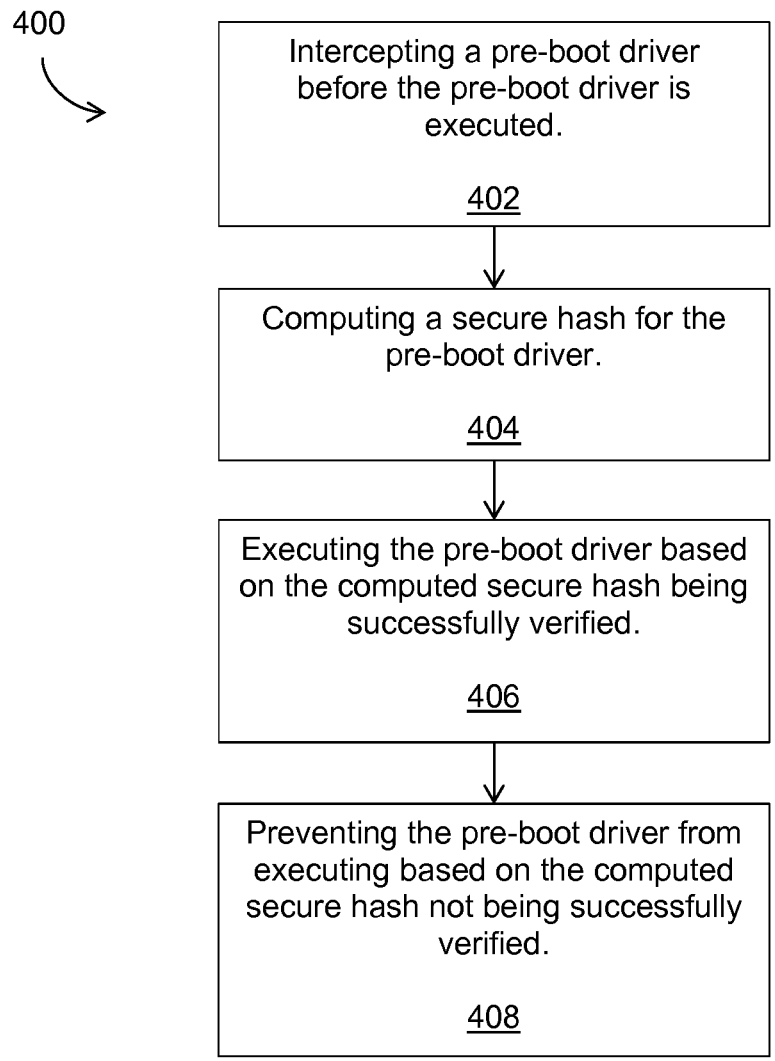
FIG. 4 shows a method in accordance with various examples.

The functionality performed by the engines 302, 304 of FIG. 3 and the modules 124, 126 of FIG. 1 and FIG. 2 will now be described with reference to the flow diagram of FIG. 4. The method 400 begins at 402 by intercepting a pre-boot driver before the pre-boot driver is executed. As used herein, intercepted refers to a state where the code (pre-boot driver, OS kernel) may have been loaded by the processor but not yet executed by the processor, such that the verification process takes place between loading the code and executing the code. The processor 116 may be directed by the secure hash calculation engine 302 to intercept one of the pre-boot drivers 104 before they are executed. Additionally, the processor 116 may also be directed to intercept early OS code, such as an image of an OS kernel, from the OS 114 before the early OS code is executed.

The method 400 then continues at 404 by computing a secure hash for the pre-boot driver. The computation of the secure hash may be performed by the secure hash calculation engine 302, which may use any standard secure hash, such as SHA-2 or SHA-3. Regardless of whether or not a standard secure hash is used by the secure hash calculation engine 302, the same secure hash may be used by the trusted third party that compiled the whitelist 130 and the secure hash calculation engine 302 to ensure proper verification of the pre-boot drivers and OS code. Additionally, the secure hash calculation engine 302 may also calculate secure hashes for images of early OS code, including the loader and kernel, of the OS 114. Further, the secure hash calculation engine 302 may calculate a secure hash for each sector of the mass storage device 112 where early files of the OS 114 are stored, for instance, if the mass storage device 112 is encrypted.

Referring back to FIG. 1, once the secure hash has been calculated for a pre-boot driver and OS code, the secure hash verification engine 304 of the system 100 may cause the processor 116 to compare the calculated secure hash value against the whitelist 108 to verify the pre-boot driver. A positive verification results when the computed secure hash value equals the stored secure hash value contained in the whitelist 108. As discussed above, the whitelist 108 may be a copy of the whitelist 130 and may be periodically refreshed to ensure the whitelist 108 is up to date and not stale.

Referring back to FIG. 2, the system 200 may forward the calculated secure hash value to one of the servers 122 so that the trusted third party may perform the comparison, or verification, step. The server 122 that receives the calculated secure hash may compare the calculated secure hash value to the secure hash values contained in the whitelist 130. Once the verification is performed, the sever 122 may send the verification results back to the processor 116 so that the processor knows how to proceed for that pre-boot driver, OS code. If the verification is successful, the server 122 may only send an OK, or other message alerting the processor 116 of the system 200 that the pre-boot driver is verified. Alternatively, if the hash values do not agree resulting in an unsuccessful verification, the server 122, in addition to alerting the processor 116 of the unsuccessful verification, may forward an updated version of the pre-boot driver so that the system 200 may update the unverified pre-boot driver.

The method 400 then continues at step 406 with executing the pre-boot driver based on the computed secure hash and the stored secure hash being successfully verified. Again, this step may also be completed for images of early OS code and a sector of the mass storage device 112 storing the OS 114 if the mass storage device 112 is encrypted. The processor 116 may allow the pre-boot driver to execute based on the successful verification. The verification may show that the pre-boot driver (OS kernel image) may not have been corrupted, by malware for example, and may be trusted by the systems 100 and 200.

The method 400 lastly continues at step 408 with preventing the pre-boot driver from executing based on the computed secure hash not being successfully verified. The processor 116 may prevent the pre-boot driver from executing based on the miss-compare and additionally based on the security protocol 110. Since a miss-compare may alert the systems 100 and 200 of a corrupt pre-boot driver, which may be malware, the security protocol 110 may prevent the processor 116 from executing the unverified pre-boot driver. In another implementation, the security protocol may allow the pre-boot driver to continue to execute even though it was unsuccessfully verified and the pre-boot driver may be corrupt and potentially malicious.

Alternatively, the security protocol 110 of the system 100 may direct the processor 116 to download a new version of the unverified pre-boot driver from one of the servers 122. In this implementation, the security protocol 116 may also direct the processor 116 to update the whitelist 108 by retrieving the newest version of the whitelist 130 and replacing the old whitelist 108. In another implementation, if the system 100 obtains a miss-compare when using a locally stored copy of the whitelist, such as whitelist 108, the system 100 may download a new copy of the whitelist 130 to determine if the miss-compare was a result of a pre-boot driver update on the system 100 and using a stale version of the whitelist 108. Alternatively or additionally, the whitelist 108 of the system 100 may be updated any time a miss-compare may be encountered to determine if the miss-compare may have been the result of a stale whitelist 108 and not due to a corrupt pre-boot driver 104.

Figure 5:
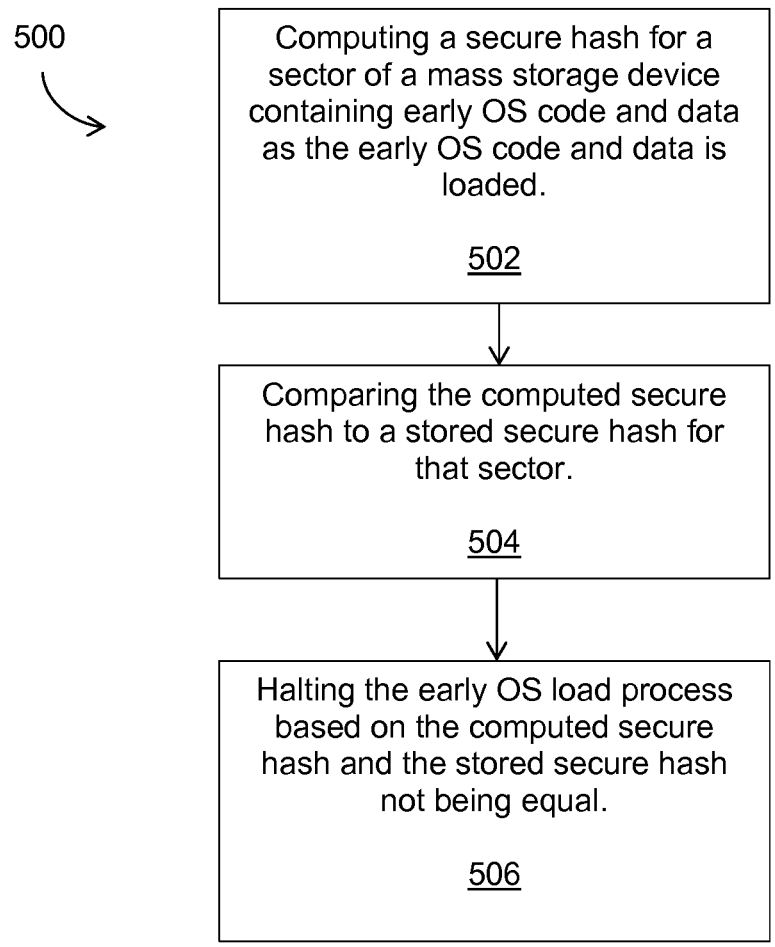
FIG. 5 shows a method in accordance with various examples.

FIG. 5 shows the method 500 in accordance with various examples and that may be implemented by either the system 100 or the system 400. The method 500 begins at 502 by computing a secure hash for a sector of a mass storage device containing early OS code and data as the early OS code and data is loaded. The computation of the secure hash may be performed by the secure hash calculation engine 302 on a sector of the mass storage device 112. In this implementation, the sector of the mass storage device containing the OS may be encrypted. The method 500 continues at 504 by comparing the computed secure hash to a stored secure hash for that sector. The comparison may be performed by the secure hash verification engine 304 of the system 100 using the whitelist 108. Alternatively, if the system 200 is performing the comparison, then the system 200 may transmit the secure hash calculation to one of the servers 122 so the comparison may be made by the server using the whitelist 130. The method 500 ends at 506 by halting the early OS load process based on the computed secure hash and the stored secure hash not being equal. Since the method 502 is occurring as the early OS code is being loaded by the processor, such as the processor 116 of the system 100 or the system 200, the loading process for that sector may be halted. Halting the loading of the early OS code on that sector of the mass storage device may be similar to the processor 116 not executing a pre-boot driver when a secure hash is not verified.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
a secure hash calculation engine comprising a physical processor, the secure hash calculation engine to intercept a pre-boot driver after the pre-boot driver is loaded and compute a secure hash for the pre-boot driver before the pre-boot driver is executed and prior to loading an operating system;
wherein the pre-boot driver is executed when the computed secure hash matches a hash on a whitelist;
wherein, when the computed secure hash does not match any hash on a whitelist, the matching being performed by a processor, the system executes a local security protocol, the local security protocol comprising:
not executing the loaded pre-boot driver;
downloading a new version of the pre-boot driver when the computer secure hash does not match a hash on the whitelist, but skipping downloading of the new version of the pre-boot driver when the secure hash matches a hash on the whitelist; and
updating the whitelist; and
wherein the local security protocol is executed while executing a Basic Input/Output System (BIOS) prior to loading an operating system.

2. The system of claim 1, wherein the whitelist is locally stored.

3. The system of claim 1, wherein the whitelist is remotely stored.

4. The system of claim 2, wherein the locally stored whitelist is a copy of a remotely stored whitelist.

5. The system of claim 2, further comprising periodically updating the locally stored whitelist.

6. The system of claim 1, wherein the secure hash calculation engine is further to intercept an image of an operating system (OS) kernel.

7. A method, comprising:
intercepting, by a physical processor, a pre-boot driver before the pre-boot driver is executed;
computing, by the processor, prior to loading an operating system, a secure hash for the pre-boot driver;
executing, by the processor, the pre-boot driver when the computed secure hash matches a hash on a whitelist;

not executing, by the processor, the pre-boot driver when the computed secure hash does not match any hash on a whitelist, and, instead, determining whether to download a new version of the pre-boot driver comprising downloading a new version of the pre-boot driver and updating the whitelist when the computed secure hash does not match a hash on the whitelist and skipping download of the new version of the pre-boot driver otherwise; and verifying, by the processor using secure hash matching to the whitelist, an Operating System (OS) image;

wherein the method is performed while executing a Basic Input/Output System (BIOS) prior to loading an operating system.

8. The method of claim 7, further comprising:

forwarding, by the processor, the computed secure hash to a remote server; and receiving, from the remote server, a verification result comprising the comparison of the computed secure hash with a hash from a whitelist.

9. The method of claim 7, wherein the whitelist is stored locally.

10. The method of claim 9, further comprising downloading, by the processor, the whitelist from a remote server.

11. The method of claim 7, further comprising verifying, by the processor, images of an Operating System (OS) loader and an OS kernel.

12. The method of claim 7, further comprising:

computing, by a processor, a sector secure hash for a sector of a mass storage device comprising early Operating System (OS) code;

comparing, by the processor, the sector secure hash with a stored secure hash for the sector; and halting, by the processor, an early OS load process based on the sector secure hash and the stored secure hash not being equal.

13. The method of claim 10, further comprising updating, by the processor, the whitelist.

14. A non-transitory computer readable storage device (CRSD) storing code, that when executed, causes a processor while executing a Basic Input/Output System (BIOS) prior to loading an operating system to:

intercept a pre-boot driver before the driver is executed;

compute, a hash value for the pre-boot driver;

execute the pre-boot driver when the computed hash matches a hash from a whitelist; and execute a local security protocol when the computed hash does not match any hash on a whitelist;

wherein the local security protocol contains rules for handling pre-boot drivers when the computed hash does not match any hash on a whitelist, the matching being performed by a processor, the local security protocol comprising:

not executing the loaded pre-boot driver; and determining whether to download a new version of the pre-boot driver comprising downloading a new version of the pre-boot driver and updating the whitelist when the computed secure hash does not match a hash on the whitelist, and skipping download of the new version of the pre-boot driver when the computed secure hash matches a hash on the whitelist.

15. The CRSD of claim 14, wherein the whitelist is local.

16. The CRSD of claim 14, wherein the code causes the processor to:

send the computed hash to a remote server to compare the computed hash with hashes on a remote whitelist; and receive a result from the remote server.

17. The CRSD of claim 14, wherein the security protocol does not allow the pre-boot driver to be executed when the computed hash does not match any hash on the whitelist.

* * * * *